US010863129B2

United States Patent
Hoshino et al.

(10) Patent No.: US 10,863,129 B2
(45) Date of Patent: Dec. 8, 2020

(54) IMAGING APPARATUS AND IMAGING APPARATUS CONTROL METHOD TO REDUCE POWER CONSUMPTION WITHOUT REDUCTION OF NUMBER OF PIXEL SIGNALS

(71) Applicant: SONY SEMICONDUCTOR SOLUTIONS CORPORATION, Kanagawa (JP)

(72) Inventors: Kazuhiro Hoshino, Kanagawa (JP); Takahiro Iinuma, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/463,717

(22) PCT Filed: Oct. 10, 2017

(86) PCT No.: PCT/JP2017/036631
§ 371 (c)(1),
(2) Date: May 23, 2019

(87) PCT Pub. No.: WO2018/135049
PCT Pub. Date: Jul. 26, 2018

(65) Prior Publication Data
US 2019/0327440 A1 Oct. 24, 2019

(30) Foreign Application Priority Data
Jan. 17, 2017 (JP) ................................. 2017-006086

(51) Int. Cl.
H04N 5/335 (2011.01)
H04N 5/3745 (2011.01)
(Continued)

(52) U.S. Cl.
CPC ......... *H04N 5/37455* (2013.01); *H04N 5/343* (2013.01); *H04N 5/3698* (2013.01); *H04N 5/378* (2013.01)

(58) Field of Classification Search
CPC .. H04N 5/37455; H04N 5/343; H04N 5/3698; H04N 5/378
(Continued)

(56) References Cited

U.S. PATENT DOCUMENTS

2004/0141079 A1* 7/2004 Yamaguchi ............ H04N 5/374
348/308
2015/0326806 A1 11/2015 Moriwaka

FOREIGN PATENT DOCUMENTS

CN 104885445 A 9/2015
EP 2940992 A1 11/2015
(Continued)

OTHER PUBLICATIONS

International Search Report and Written Opinion of PCT Application No. PCT/JP2017/036631, dated Dec. 19, 2017, 08 pages of ISRWO.

*Primary Examiner* — Usman A Khan
(74) *Attorney, Agent, or Firm* — Chip Law Group

(57) ABSTRACT

Reducing power consumption without reducing the number of pixel signals in a solid-state imaging element that performs AD conversion of a pixel signal. A pixel array unit includes a plurality of lines each having a plurality of pixels arranged in a predetermined direction. A scanning circuit sequentially selects the plurality of lines and then controls to output an analog signal from each of the pixels within the selected line in a non-addition mode, and simultaneously selects the plurality of lines and controls to add up the analog signals of each of the pixels arranged in a direction perpendicular to the predetermined direction and output the added signals in a pixel addition mode. The analog-to-digital
(Continued)

conversion unit converts each of the analog signals into a digital signal. The control unit performs control of switching from one of the pixel addition mode and the non-addition mode to the other on the basis of the digital signal.

8 Claims, 20 Drawing Sheets

(51) Int. Cl.
    *H04N 5/343*     (2011.01)
    *H04N 5/369*     (2011.01)
    *H04N 5/378*     (2011.01)

(58) Field of Classification Search
    USPC .......................................................... 348/308
    See application file for complete search history.

(56) References Cited

FOREIGN PATENT DOCUMENTS

| | | |
|---|---|---|
| JP | 2000-261728 A | 9/2000 |
| JP | 2012-165168 A | 8/2012 |
| JP | 2015-039086 A | 2/2015 |
| WO | 2013/088699 A1 | 6/2013 |
| WO | 2014/103730 A1 | 7/2014 |

\* cited by examiner

IMAGING APPARATUS AND IMAGING APPARATUS CONTROL METHOD TO REDUCE POWER CONSUMPTION WITHOUT REDUCTION OF NUMBER OF PIXEL SIGNALS

CROSS REFERENCE TO RELATED APPLICATIONS

This application is a U.S. National Phase of International Patent Application No. PCT/JP2017/036631 filed on Oct. 10, 2017, which claims priority benefit of Japanese Patent Application No. JP 2017-006086 filed in the Japan Patent Office on Jan. 17, 2017. Each of the above-referenced applications is hereby incorporated herein by reference in its entirety.

TECHNICAL FIELD

The present technology relates to an imaging apparatus and an imaging apparatus control method. More specifically, the present invention relates to an imaging apparatus that converts an analog pixel signal into a digital signal, and a method for controlling the imaging apparatus.

BACKGROUND ART

Conventionally, an apparatus including an imaging function has been using a solid-state imaging element for capturing image data. For example, the solid-state imaging element includes: a pixel array including pixels arranged in a two-dimensional lattice pattern; a scanning circuit that sequentially selects pixel rows and controls to output an analog pixel signal; and a column analog-to-digital converter (ADC) that converts a pixel signal into a digital signal for each of the pixel rows. In this configuration, power consumption of the column ADC is particularly greater than in other circuits. Therefore, in order to reduce the power consumption, there has been proposed an imaging apparatus including a solid-state imaging element that partially drives pixels in a cutout region of a pixel array and controls to output a pixel signal from the pixel (for example, refer to Patent Document 1).

CITATION LIST

Patent Document

Patent Document 1: Japanese Patent Application Laid-Open No. 2012-165168

SUMMARY OF THE INVENTION

Problems to be Solved by the Invention

In the above-described conventional technology, the column ADC partially performs analog-to-digital (AD) conversion onto the pixel signals from a part of the pixels of the pixel array, making it possible to reduce the power consumption as compared with the case where AD conversion is performed on all the pixels. However, the above-described conventional technology does not read pixel signals from pixels other than the cutout region. Accordingly, the imaging apparatus might not be able to perform appropriate image processing on the captured image data. For example, when the imaging apparatus performs processing of analyzing image data and detecting motions of an object, it is difficult to detect motions of parts other than the cutout region. In view of this, it is desirable not to reduce the number of pixel signals to be read. In this manner, the above-described conventional technology has a problem that power consumption cannot be reduced without reducing the number of pixel signals.

The present technology has been developed in view of such a situation, and aims to reduce power consumption without reducing the number of pixel signals in a solid-state imaging element that performs AD conversion on a pixel signal.

Solutions to Problems

The present technology is provided to solve the above-described problem and a first aspect of the present technology is an imaging apparatus and a method for controlling the same, the imaging apparatus including: a pixel array unit including a plurality of lines each having a plurality of pixels arranged in a predetermined direction; a scanning circuit that sequentially selects the plurality of lines and controls to output an analog signal from each of the pixels within the selected line in a non-addition mode and that controls to add up the analog signal of each of the pixels arranged in a direction perpendicular to the predetermined direction and output the added signals in a pixel addition mode; an analog-to-digital conversion unit that converts each of the analog signals to a digital signal; and a control unit that performs control of switching from one of the pixel addition mode and the non-addition mode to the other of the pixel addition mode and the non-addition mode on the basis of the digital signal. This would produce an effect that the mode can be switched to either the pixel addition mode or the non-addition mode on the basis of the digital signal.

Furthermore, in the first aspect, the analog-to-digital converter may output the digital signal as pixel addition data in the pixel addition mode, and the control unit may switch from the non-addition mode to the pixel addition mode on the basis of the pixel addition data. This would produce an effect that the non-addition mode can be switched to the pixel addition mode on the basis of the pixel addition data.

Furthermore, in the first aspect, the control unit may measure the speed of an object from the pixel addition data and may switch from the non-addition mode to the pixel addition mode in a case where the speed exceeds a predetermined speed. This would produce an effect that the non-addition mode can be switched to the pixel addition mode in a case where the speed that exceeds a predetermined speed is measured.

Furthermore, in the first aspect, the control unit may measure the speed in the predetermined direction. This would produce an effect that the non-addition mode can be switched to the pixel addition mode in a case where the speed that exceeds a predetermined speed is measured in a predetermined direction.

Furthermore, in the first aspect, the control unit may measure the speed in a depth direction. This would produce an effect that the non-addition mode can be switched to the pixel addition mode in a case where the speed that exceeds a predetermined speed is measured in the depth direction.

Furthermore, in the first aspect, the pixel array unit may include: the plurality of pixels; and a pixel addition unit that adds up the analog signal of each of the pixels arranged in the perpendicular direction and that outputs the added analog signals in the pixel addition mode. This would produce an effect that the analog signals of each of the pixels arranged in the direction perpendicular to the predetermined direction in the pixel addition mode are added up.

Furthermore, in the first aspect, the imaging apparatus may further include a digital signal processing unit that executes predetermined processing on the digital signal in the non-addition mode. This would produce an effect that predetermined processing can be executed on the digital signal in the non-addition mode.

Furthermore, in the first aspect, the control unit may switch to the pixel addition mode when a predetermined time has elapsed after switching to the non-addition mode. This would produce an effect that the pixel addition mode can be switched to the non-addition mode when the predetermined time has elapsed.

Effects of the Invention

According to the present technology, it is possible to achieve an excellent effect of reducing power consumption without reducing the number of pixel signals in a solid-state imaging element that performs AD conversion on a pixel signal. Note that effects described herein are non-restricting. The effects may be any of effects described in the present disclosure.

MODE FOR CARRYING OUT THE INVENTION

Hereinafter, modes for carrying out the present technology (hereinafter, referred to as embodiment(s)) will be described. The description will be given in the following order.

1. First embodiment (example of switching from pixel addition mode to non-addition mode when there is motion)

2. Second embodiment (an example of switching from pixel addition mode to non-addition mode when there is object movement in a row direction)

3. Third embodiment (an example of switching from pixel addition mode to non-addition mode when there is object movement in the depth direction)

1. First Embodiment

[Configuration Example of Imaging Apparatus]

Figure 1:
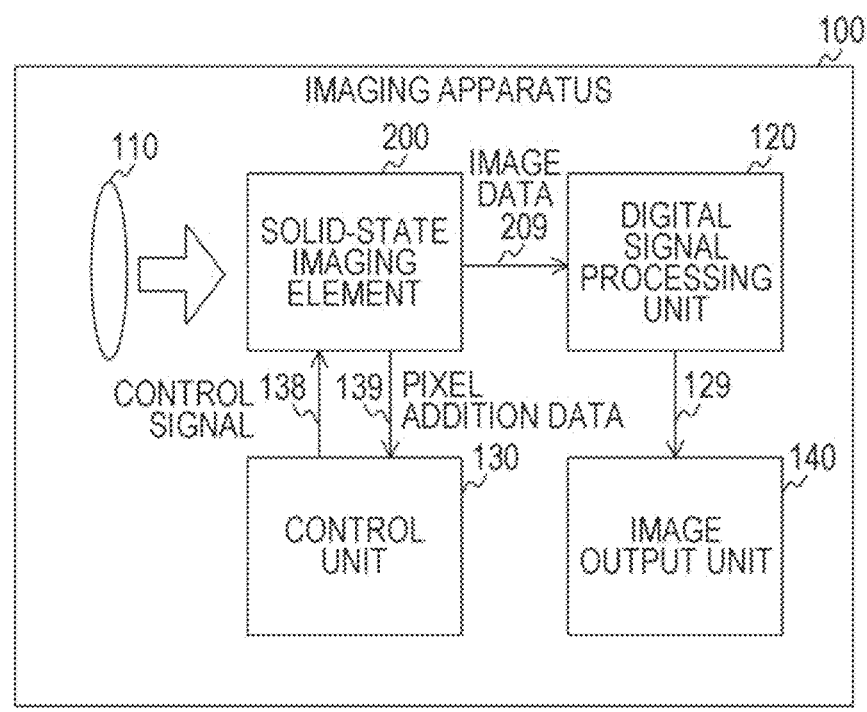
FIG. 1 is a block diagram illustrating a configuration example of an imaging apparatus according to a first embodiment of the present technology.

FIG. 1 is a block diagram illustrating a configuration example of an imaging apparatus 100 according to an embodiment of the present technology. The imaging apparatus 100 is an apparatus having an imaging function, and includes an imaging lens 110, a solid-state imaging element 200, a digital signal processing unit 120, a control unit 130, and an image output unit 140. Assumable examples of the imaging apparatus 100 include a digital camera, a smartphone, a personal computer, and the like. Examples of digital camera include a monitoring camera, an Intelligent Transport Systems (ITS) camera, a home camera, an action camera, an Internet of Things (IoT) camera, and the like.

The imaging lens collects light from a subject and guides the light to the solid-state imaging element 200.

The solid-state imaging element 200 captures image data in accordance with a control signal from the control unit 130. Here, the control signal includes a vertical synchronization signal and a mode signal, for example. The vertical synchronization signal is a timing signal indicating imaging timing. For example, periodic signals of 30 hertz (Hz) or 60 hertz (Hz) are used as vertical synchronization signals.

In addition, a mode signal is a signal instructing, as an operation mode, any of a pixel addition mode in which pixel addition is performed and a non-addition mode in which pixel addition is not performed. In the non-addition mode, the solid-state imaging element 200 captures image data in synchronization with the vertical synchronization signal and supplies the image data to the digital signal processing unit 120 via a signal line 209. In contrast, in the pixel addition mode, the solid-state imaging element 200 performs pixel addition and supplies the added data as pixel addition data to the control unit 130 via a signal line 139.

The digital signal processing unit 120 executes predetermined signal processing on image data. For example, demosaic processing, white balance processing, object detection processing, or the like, are executed as signal processing. The digital signal processing unit 120 supplies processed image data to the image output unit 140 via a signal line 129.

The control unit 130 controls the entire imaging apparatus 100. When the power supply is turned on, the control unit 130 first sets the operation mode to the pixel addition mode and then supplies the mode signal and the vertical synchronization signal to the solid-state imaging element 200 via a signal line 138. Next, the control unit 130 switches the operation mode from the pixel addition mode to the non-addition mode on the basis of pixel addition data.

The image output unit 140 outputs image data to an external device by a wired or wireless link.

Note that while the imaging apparatus 100 outputs the image data to the outside, the image data may be recorded in a memory or the like. Furthermore, the imaging apparatus 100 may further output data other than the image data. For example, the imaging apparatus 100 may output an object detection result or data notifying that the mode has been switched.

[Configuration Example of Solid-State Imaging Element]

Figure 2:
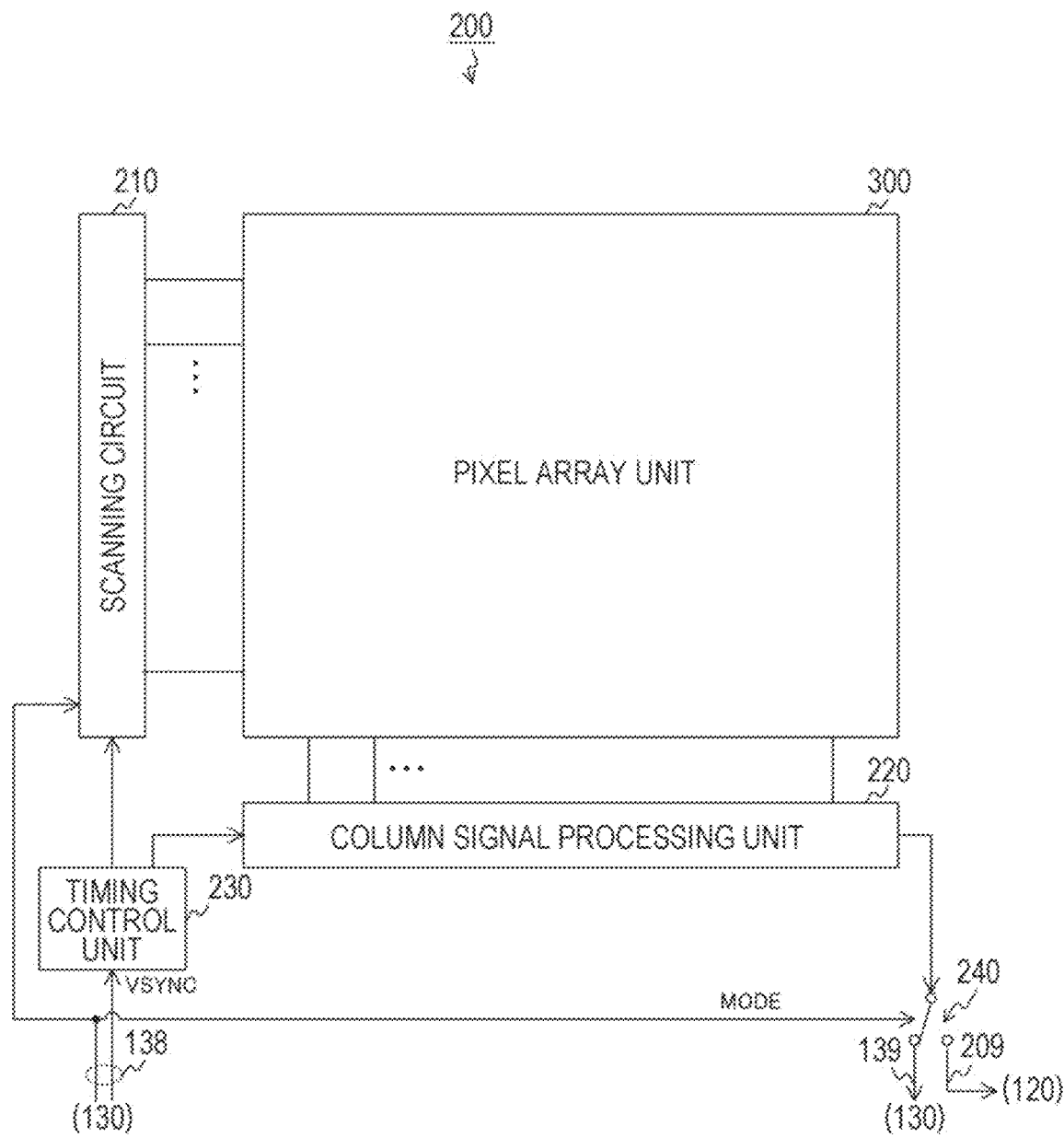
FIG. 2 is a block diagram illustrating a configuration example of a solid-state imaging element according to the first embodiment of the present technology.

FIG. 2 is a block diagram illustrating a configuration example of the solid-state imaging element 200 according to a first embodiment of the present technology. The solid-state imaging element 200 includes a scanning circuit 210, a pixel array unit 300, a column signal processing unit 220, a timing control unit 230, and a switch 240.

The pixel array unit 300 includes a plurality of pixels arranged in a two-dimensional lattice pattern. Hereinafter, a set of pixels arranged in a predetermined direction will be referred to as a "row", and a set of pixels arranged in a direction perpendicular to the row will be referred to as a "column". Furthermore, the number of rows will be defined as M (M is an integer) and the number of columns as N (N is an integer). Note that a row is an example of a line described in the claims.

The scanning circuit 210 drives the pixel array unit 300. A mode signal MODE is input to the scanning circuit 210. In a case where the pixel addition mode is instructed by the mode signal MODE, the scanning circuit 210 selects one of all the rows in synchronization with a vertical synchronization signal VSYNC, and controls to add the pixel signals in the column direction. With this operation, a pixel addition signal obtained by adding all the pixel signals in a column is output for each of columns. Since the number of columns is N, the number of pixel addition signals output within a period of the vertical synchronization signal VSYNC is N.

In contrast, in a case where the non-addition mode is instructed by the mode signal MODE, the scanning circuit 210 sequentially selects rows in synchronization with the vertical synchronization signal VSYNC, and controls each of pixels within the row to output a pixel signal. Since the number of rows is M and the number of columns is N, the number of pixel signals output within the period of the vertical synchronization signal VSYNC is M×N.

The column signal processing unit 220 executes predetermined signal processing including AD conversion processing on each of the pixel signals from the selected row. In the pixel addition mode, the column signal processing unit 220 converts each of the N pixel addition signals into digital pixel addition data for each of periods of the vertical synchronization signal VSYNC.

In contrast, in the non-addition mode, the column signal processing unit 220 executes processing of converting N pixel addition signals into digital pixel data for M times for each of periods of the vertical synchronization signal VSYNC. The column signal processing unit 220 outputs processed data to the switch 240. Note that the column signal processing unit 220 is an example of an analog-to-digital conversion unit described in the claims.

Typically, among the circuits in the solid-state imaging element 200, the circuit with the largest power consumption is a circuit that performs AD conversion (such as the column signal processing unit 220). As described above, AD conversion is performed on N×M pixel signals in the non-addition mode every period of the vertical synchronization signal VSYNC, whereas AD conversion is performed on only N pixel addition signals in the non-addition mode. Therefore, the power consumption of the solid-state imaging element 200 is much smaller in the pixel addition mode than in the non-addition mode.

The timing control unit 230 controls operation timing of each of the scanning circuit 210 and the column signal processing unit 220 in synchronization with the vertical synchronization signal VSYNC.

The switch 240 switches an output destination of the data from the column signal processing unit 220 on the basis of the mode signal MODE. In a case where the pixel addition mode is instructed by the mode signal MODE, the switch 240 outputs pixel addition data from the column signal processing unit 220 to the control unit 130. In contrast, in a case where the non-addition mode is instructed by the mode signal MODE, the switch 240 outputs the pixel data from the column signal processing unit 220 to the digital signal processing unit 120.

Figure 3:
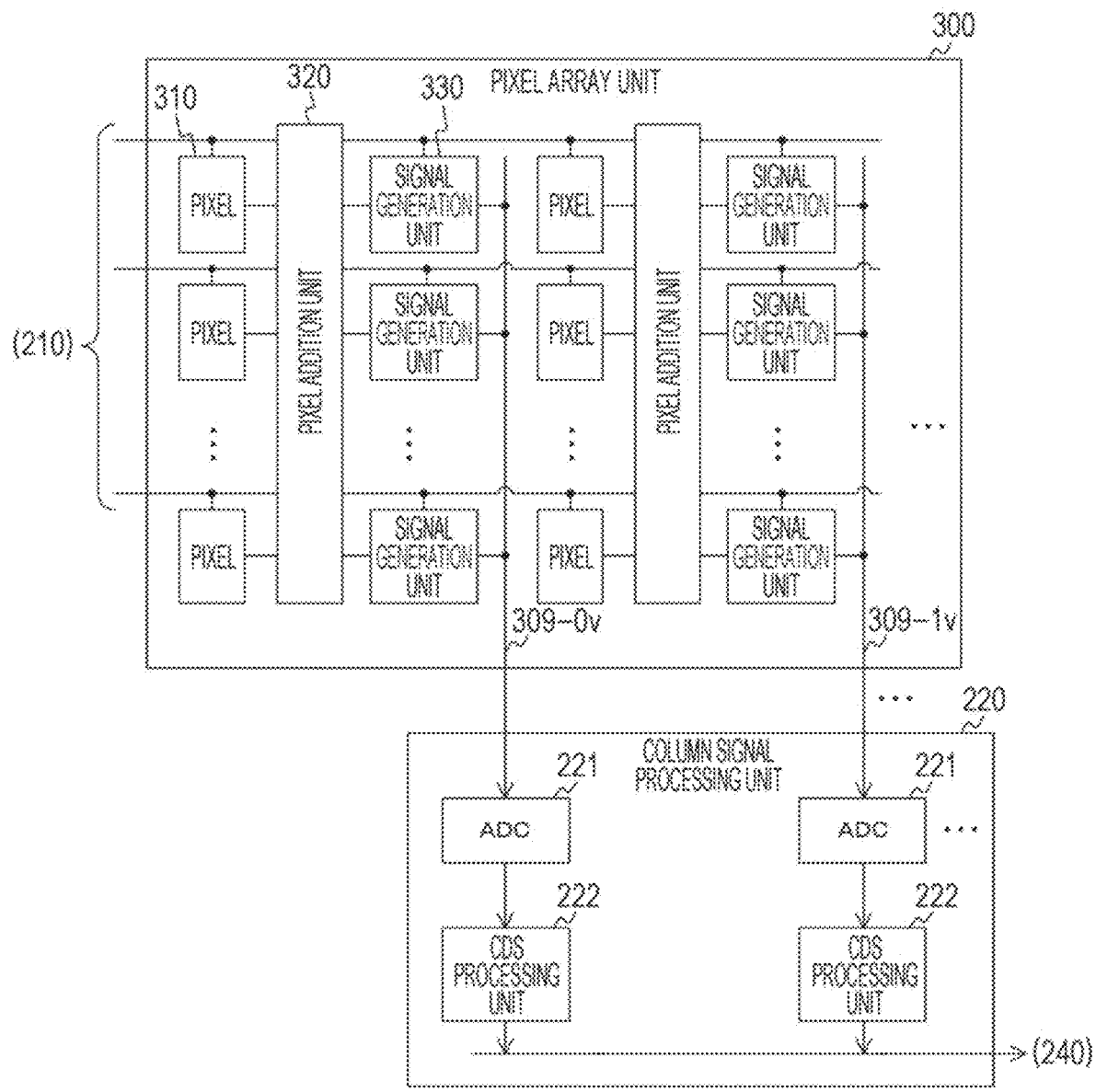
FIG. 3 is a block diagram illustrating a configuration example of a pixel array unit and a column signal processing unit in the first embodiment of the present technology.

FIG. 3 is a block diagram illustrating a configuration example of the pixel array unit 300 and the column signal processing unit 220 in the first embodiment of the present technology. The pixel array unit 300 includes a plurality of pixels 310, a plurality of pixel addition units 320, and a plurality of signal generation units 330. The pixel addition unit 320 is disposed for each of columns, and the signal generation unit 330 is disposed for each of the pixels 310. Furthermore, vertical signal lines 309-$nV$ are wired for each of the columns. Here, n is an integer from 0 to N−1.

The pixel 310 generates a charge by photoelectric conversion under the control of the scanning circuit 210, and transfers the generated charge to the corresponding signal generation unit 330 via the pixel addition unit 320.

Under the control of the scanning circuit 210, the signal generation unit 330 generates an analog signal (a pixel signal or a pixel addition signal) corresponding to the transferred charge amount. The signal generation unit 330 outputs an analog signal to the column signal processing unit 220 via the corresponding vertical signal line 309-$nv$.

The pixel addition unit 320 adds up the pixel signals in the corresponding columns under the control of the scanning circuit 210.

The column signal processing unit 220 includes an ADC 221 and a correlated double sampling (CDS) processing unit 222 for each of columns. The ADC 221 converts an analog signal from a corresponding column into a digital signal (pixel data or pixel addition data). The CDS processing unit 222 executes CDS processing on a digital signal of a corresponding column. The CDS processing unit 222 supplies processed data to the switch 240.

[Configuration Example of Pixel Array Unit]

Figure 4:
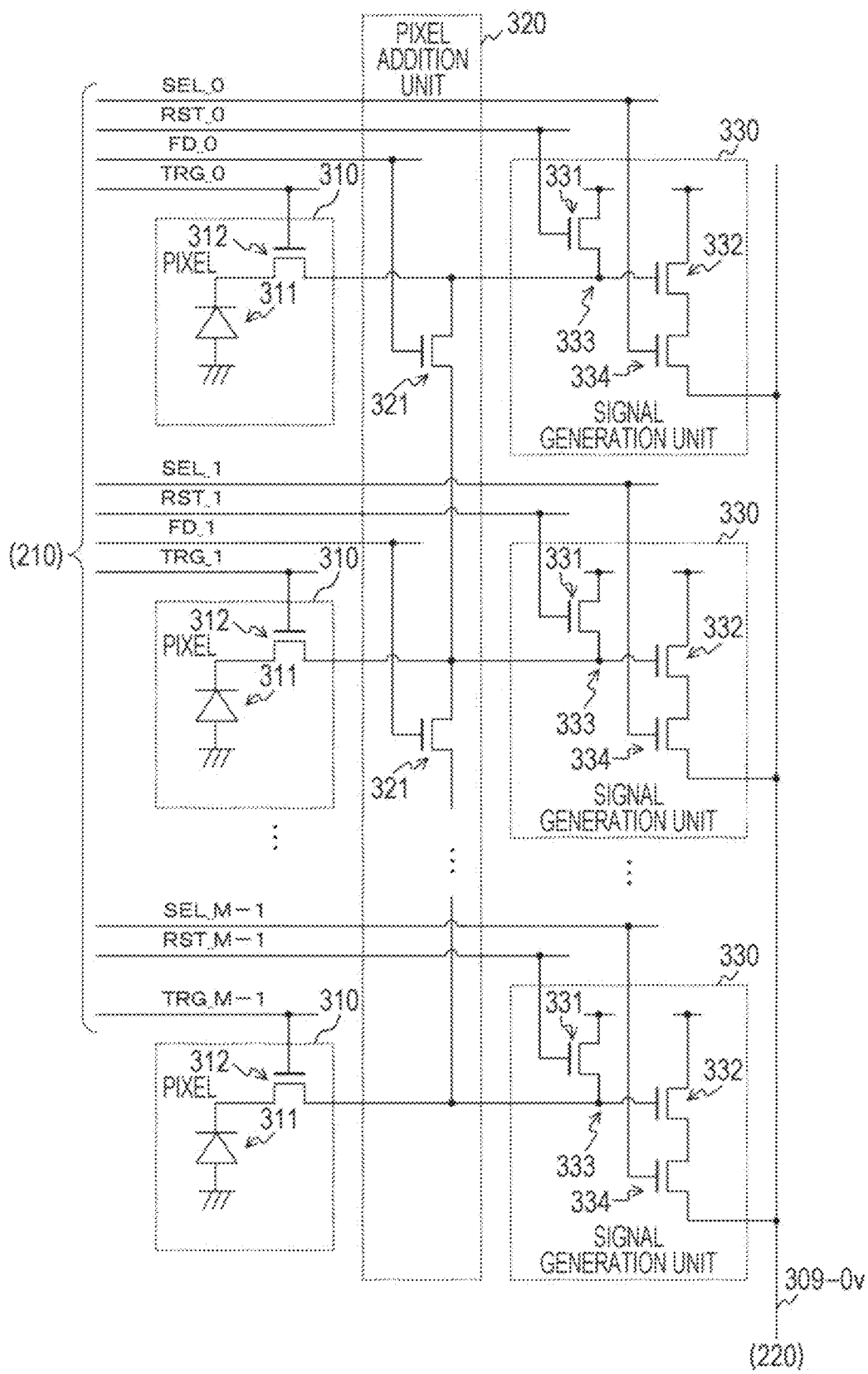
FIG. 4 is a circuit diagram illustrating a configuration example of the pixel array unit according to the first embodiment of the present technology.

FIG. 4 is a circuit diagram illustrating a configuration example of the pixel array unit 300 according to the first embodiment of the present technology. Each of the pixels 310 includes a photodiode 311 and a transfer transistor 312. In addition, each of the pixel addition units 320 includes M−1 connection transistors 321. Each of the signal generation units 330 includes a reset transistor 331, an amplification transistor 332, a floating diffusion layer 333, and a selection transistor 334.

The photodiode 311 generates a charge by photoelectric conversion. The transfer transistor 312 transfers the charge from the photodiode 311 to the floating diffusion layer 333 in accordance with a transfer signal TRG_m from the scanning circuit 210. Here, m is an integer from 0 to M−1.

The connection transistor 321 short-circuits the floating diffusion layer 333 in the m-th row and the floating diffusion layer 333 in the (m+1)th row in accordance with an addition signal FD_m from the scanning circuit 210. By short-circuiting all of the connection transistors 321 in the n-th column, the charge amount of each of the M floating diffusion layers 333 in the n-th column is averaged to substantially a same value. As a result, the signal generation unit 330 generates a signal as a result of averaging the pixel signals in the column.

The reset transistor 331 initializes a charge amount of the floating diffusion layer 333 in accordance with a reset signal RST_m. The floating diffusion layer 333 accumulates the transferred charge and generates a voltage corresponding to the accumulated charge amount. The amplification transistor 332 amplifies the voltage of the floating diffusion layer 333. The selection transistor 334 outputs the signal of the amplified voltage as a pixel signal or a pixel addition signal to the column signal processing unit 220 via the corresponding vertical signal line 309-*nv*.

Note that while the floating diffusion layer 333 is disposed for each of the pixels 310, the floating diffusion layer 333 may be shared by the plurality of pixels 310. In this case, for example, the signal generation unit 330 and the connection transistor 321 are connected shared by the plurality of pixels 310 as one unit of sharing.

Figure 5:
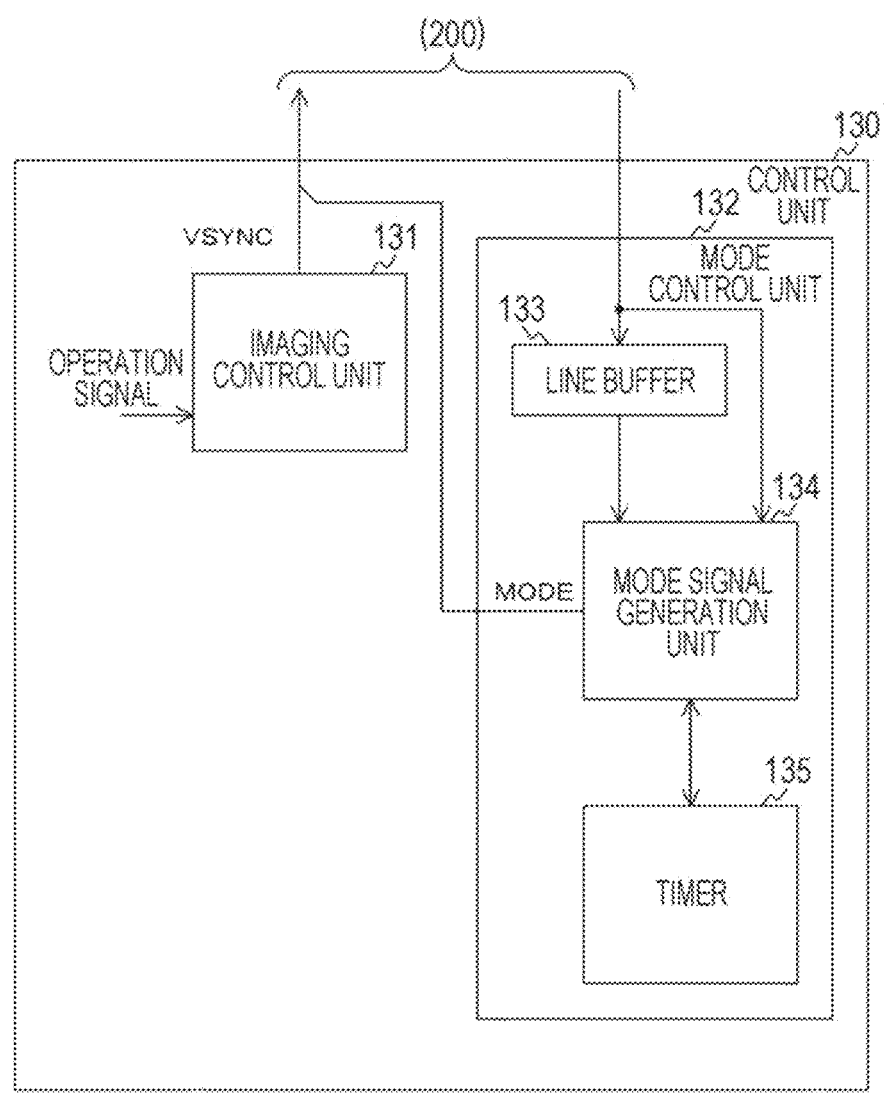
FIG. 5 is a block diagram illustrating a configuration example of a control unit according to the first embodiment of the present technology.

FIG. 5 is a block diagram illustrating a configuration example of the control unit 130 according to the first embodiment of the present technology. The control unit 130 includes an imaging control unit 131 and a mode control unit 132. Furthermore, the mode control unit 132 includes a line buffer 133, a mode signal generation unit 134, and a timer 135.

The imaging control unit 131 generates the vertical synchronization signal VSYNC in accordance with an operation signal. For example, the imaging control unit 131 starts supplying the vertical synchronization signal VSYNC to the solid-state imaging element 200 when power supply is turned on or start-up operation for starting imaging is performed. Furthermore, when stoppage operation for stopping imaging is performed, the imaging control unit 131 stops supplying the vertical synchronization signal VSYNC.

Note that the imaging control unit 131 may start supplying the vertical synchronization signal VSYNC when a preset imaging start date and time has elapsed and may stop the supply of the vertical synchronization signal VSYNC when a preset imaging finish date and time has elapsed. Alternatively, the imaging control unit 131 may start supplying the vertical synchronization signal VSYNC in accordance to reception of an imaging start signal via a network and may stop the supply of the vertical synchronization signal VSYNC in accordance to reception of an imaging finish signal via a network.

The line buffer 133 holds each of the N pieces of pixel addition data as past addition data.

The mode signal generation unit 134 generates a mode signal MODE on the basis of the pixel addition data. The mode signal generation unit 134 generates the mode signal MODE instructing the pixel addition mode and supplies the generated mode signal MODE to the solid-state imaging element 200 when the power supply is turned on or start-up operation is performed.

Next, in the pixel addition mode, the mode signal generation unit 134 switches from the pixel addition mode to the non-addition mode on the basis of the pixel addition data. For example, the mode signal generation unit 134 obtains N pieces of pixel addition data from the solid-state imaging element 200 as current addition data PAn in synchronization with the vertical synchronization signal VSYNC, and obtains N pieces of past addition data PBn from the line buffer 133. Here, PAn indicates current addition data in the n-th column, and PBn indicates past addition data in the n-th column. The mode signal generation unit 134 compares the current addition data with the past addition data and judges whether or not there is a motion in the subject.

For example, the mode signal generation unit 134 calculates a summed value SUM by the following expression.

[Mathematical Expression 1]

$$\text{SUM} = \sum_{n=0}^{N-1} (Pan - PBn) \qquad \text{Formula 1}$$

Subsequently, the mode signal generation unit 134 judges whether or not the summed value SUM exceeds a predetermined motion determination threshold. In a case where the summed value SUM exceeds the motion determination threshold, the mode signal generation unit 134 judges that there has been a motion, and switches the operation mode to the non-addition mode, and then, supplies the mode signal MODE instructing the non-addition mode to the solid-state imaging element 200.

When the operation mode has been switched to the non-addition mode, the mode signal generation unit 134 initializes a timer value of the timer 135 and causes the timer 135 to start clocking. In addition, in the non-addition mode, the mode signal generation unit 134 refers to the timer value of the timer 135 and judges whether or not the timer value exceeds a certain value (that is, a certain time has elapsed). In a case where the timer value exceeds a certain value, the mode signal generation unit 134 switches the operation mode from the non-addition mode to the pixel addition mode.

The timer 135 performs clocking under the control of the mode signal generation unit 134.

Note that while the imaging apparatus 100 is switched to the pixel addition mode when a certain time has elapsed in the non-addition mode, switching may be performed when other conditions are satisfied. For example, in the non-addition mode, the digital signal processing unit 120 in the imaging apparatus 100 may analyze image data and may detect the presence or absence of a predetermined object (car, pedestrian, etc.), and the mode signal generation unit 134 may switch to the pixel addition mode when the object is not detected. Alternatively, upon switching to the non-addition mode, the imaging apparatus 100 may notify an external device (such as a smartphone) of that effect and may start imaging and transmission of the image data. Subsequently upon receiving the switching signal from the device, the imaging apparatus 100 may shift to the pixel addition mode.

Furthermore, the imaging apparatus 100 compares the past addition data with the current addition data and judges the presence or absence of motion. Alternatively, the imaging apparatus 100 may compare the current addition data with predetermined pixel addition data preliminarily generated from a background image, instead of past addition data, and may judge the presence or absence of motion.

Figure 6:
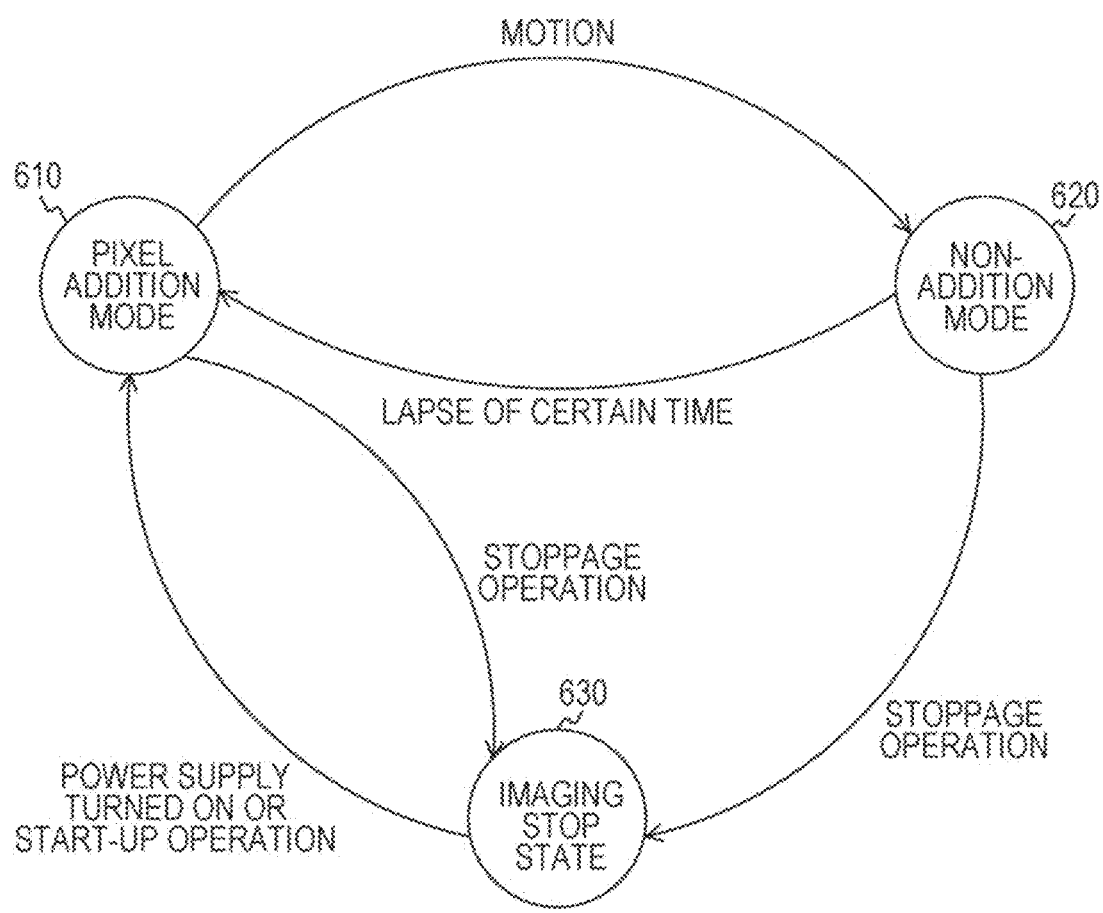
FIG. 6 is an example of a state transition diagram of the imaging apparatus according to the first embodiment of the present technology.

FIG. 6 is an example of a state transition diagram of the imaging apparatus 100 according to the first embodiment of the present technology. The state of the imaging apparatus 100 includes a pixel addition mode 610, a non-addition mode 620, and an imaging stop state 630.

The initial state of the imaging apparatus 100 is the imaging stop state 630. In the imaging stop state 630, the imaging apparatus 100 stops generation of both pixel data and pixel addition data.

When the power supply is turned on or start-up operation is performed, the imaging apparatus 100 shifts to the pixel addition mode 610. In this pixel addition mode 610, the imaging apparatus 100 performs pixel addition for each of columns and generates N pieces of pixel addition data. Subsequently, the imaging apparatus 100 judges the presence or absence of motion of the subject on the basis of the pixel addition data.

In a case where there is a motion, the imaging apparatus 100 shifts to the non-addition mode 620. Next, in the non-addition mode 620, the imaging apparatus 100 captures image data and outputs the captured image data to the outside. Subsequently, when a certain time has elapsed since the mode has shifted to the non-addition mode 620, the imaging apparatus 100 shifts to the pixel addition mode 610.

Furthermore, in a case where the stoppage operation is performed in the pixel addition mode 610 or the non-addition mode 620, the imaging apparatus 100 shifts to the imaging stop state 630.

As described above, the imaging apparatus 100 operates in the pixel addition mode 610 with very small power consumption over a period until judgment of presence of motion is made. Therefore, as compared with a configuration constantly operating in the non-addition mode 620, it is possible to greatly reduce the power consumption of the solid-state imaging element 200. For example, in a case where the number of rows is 1000, the pixel addition mode is capable of reducing the power consumption in the AD conversion to about 1/1000 of the time of the non-addition mode.

Furthermore, the non-addition mode involves no input of image data to the digital signal processing unit 120 or the image output unit 140 and involves no execution of image processing or image output. Accordingly, it is possible to greatly reduce power consumption in image processing or the like. In particular, an IoT camera among the digital cameras needs to reduces its power consumption. For this reason, the technology according to the present disclosure is desirably applied to an IoT camera.

Figure 7:
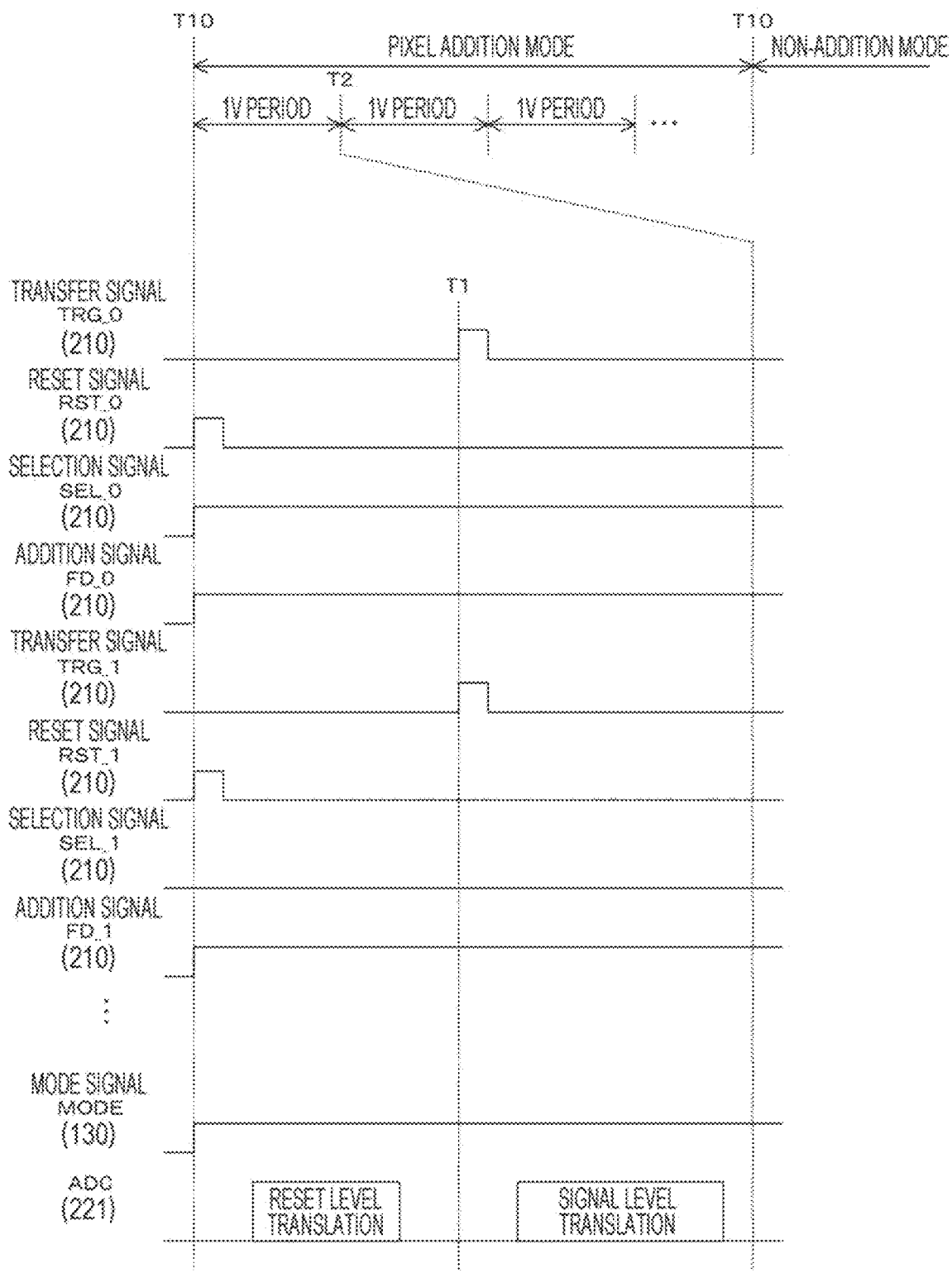
FIG. 7 is a timing chart illustrating an example of operation of a solid-state imaging element in a pixel addition mode according to the first embodiment of the present technology.

FIG. 7 is a timing chart illustrating an example of operation of the solid-state imaging element 200 in a pixel addition mode according to the first embodiment of the present technology. After shifting to the pixel addition mode at timing T0, the scanning circuit 210 transmits the reset signal RST_m to all the rows and initializes all the rows. Furthermore, the scanning circuit 210 starts transmitting the addition signal FD_m to all the rows. Furthermore, the scanning circuit 210 selects one row (for example, the 0-th row) and transmits the selection signal SEL_m to the selected row.

Subsequently, at timing T1 at which the exposure time has finished, the scanning circuit 210 transmits the transfer signal TRG_m to all the rows. With this configuration, N pixel addition signals are output. The ADC 221 performs reset level translation of the pixel addition signal immediately after timing T0 and translates the signal level of the pixel addition signal immediately after timing T1. The difference of these will be output as net pixel addition data.

Subsequently, after timing T2, the scanning circuit 210 repeats execution of similar operation every 1V period, that is, a period of the vertical synchronization signal VSYNC. In this manner, AD conversion is performed on N pixel addition signals every 1V period.

Note that while the scanning circuit 210 transmits the addition signal FD_m to all the rows and controls to perform pixel addition, it is allowable to transmit the addition signal FD_m to a part of rows. This would make it possible to further reduce power consumption.

Figure 8:
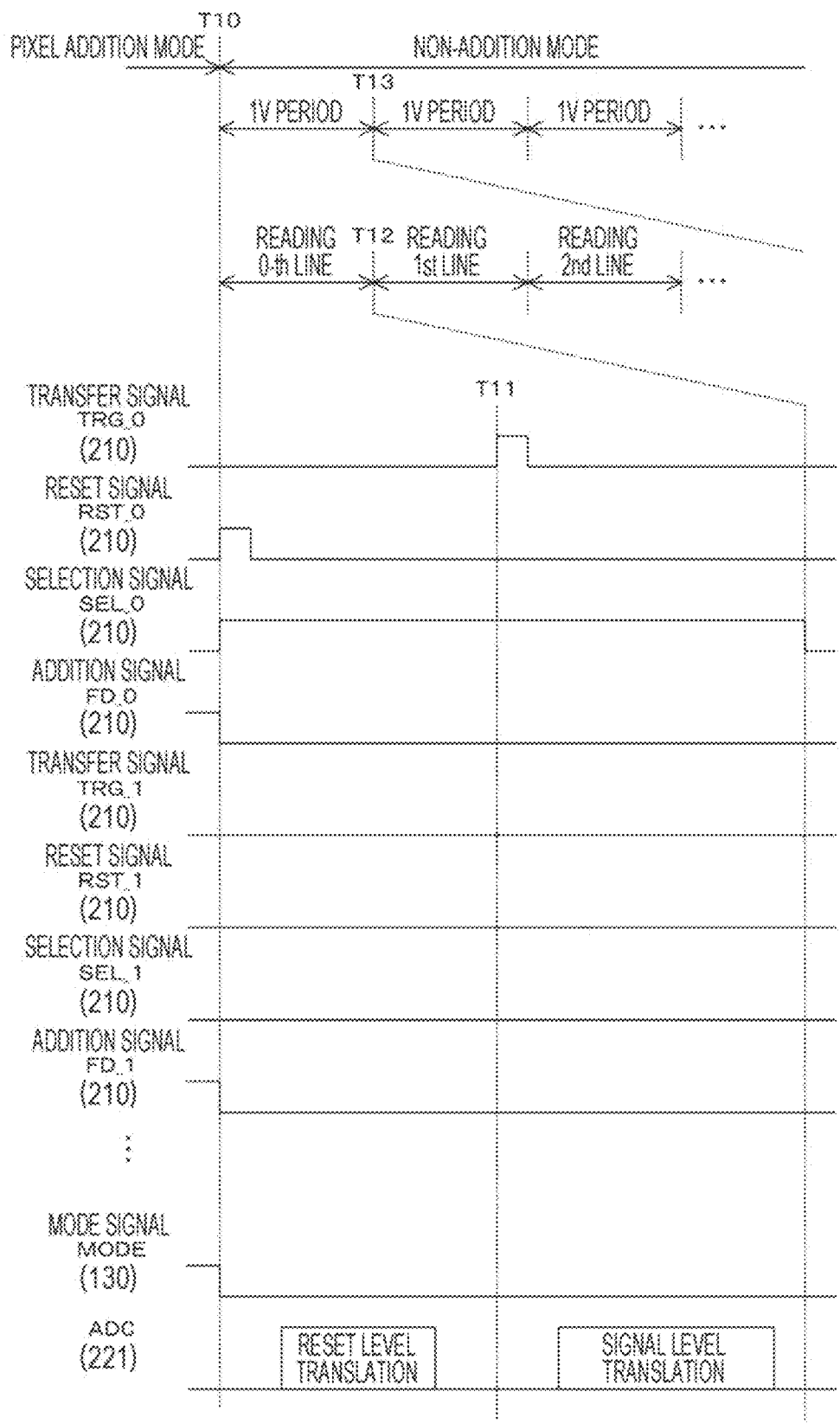
FIG. 8 is a timing chart illustrating an example of operation of a solid-state imaging element in a non-addition mode according to the first embodiment of the present technology.

FIG. 8 is a timing chart illustrating an example of operation of the solid-state imaging element 200 in the non-addition mode according to the first embodiment of the present technology. When the mode has been shifted to the non-addition mode at timing T10, the scanning circuit 210 selects the 0-th row and transmits the selection signal SEL_0, and then, transmits the reset signal RST_0.

Subsequently, at timing T11 at which the exposure time has finished, the scanning circuit 210 transmits the transfer signal TRG_0 to the 0-th row. With this configuration, N pixel signals are output. The ADC 221 performs reset level translation of the pixel signal immediately after timing T10 and translates the signal level of the pixel signal immediately after timing T11. The difference of these will be output as net pixel data. With this operation, the 0-th row is read.

Next, from the timing T12 onward, the first row to the (M−1)th row are sequentially read in a similar procedure. With M times of reading, the 0-th frame is read. At timing T13 at which the (M−1)th row of the 0-th frame is read, and onward, the first and the following frames are read every time the 1V period elapses. In this manner, AD conversion is performed on M×N pixel signals every 1V period.

Figure 9A:
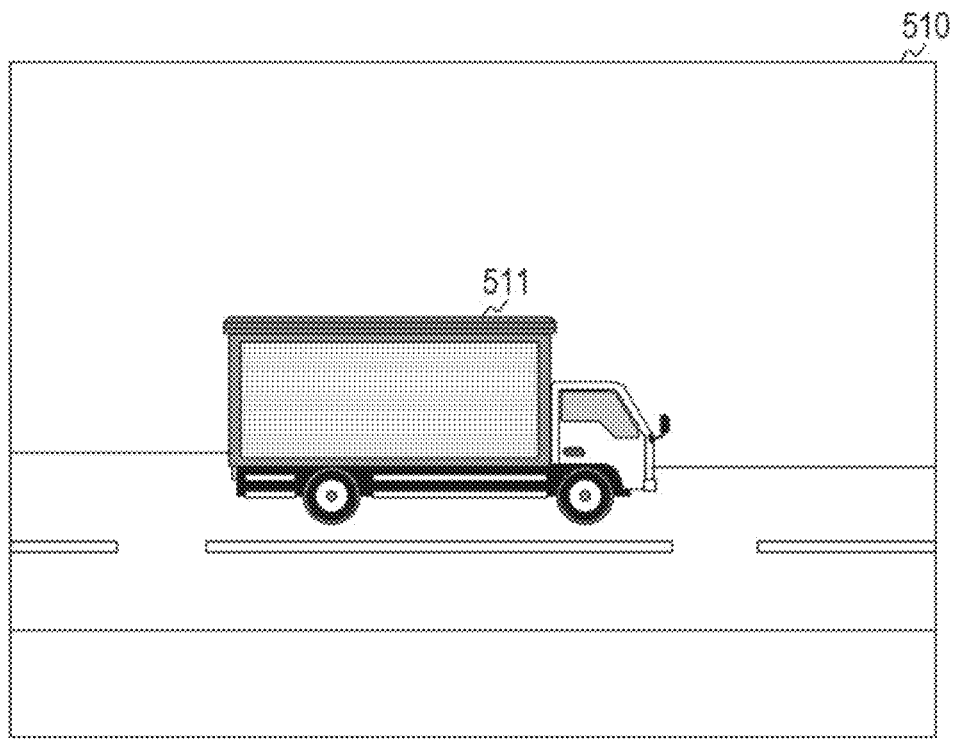
FIGS. 9A and 9B are diagrams illustrating an example of a past frame and past addition data according to the first embodiment of the present technology.
Figure 9B:
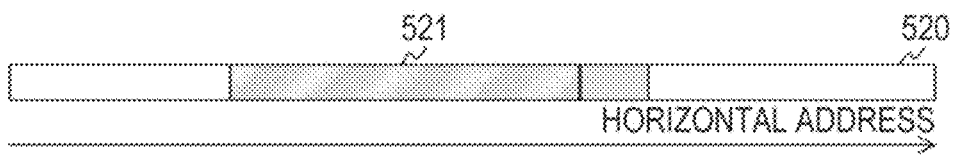

FIGS. 9A and 9B are diagrams illustrating an example of a past frame and past addition data according to the first embodiment of the present technology. FIG. 9A is an example of a past frame 510, and FIG. 9B is an example of line data 520 including N pieces of past addition data. Here, the past frame 510 is an image obtained in pixel signal arrangement in the pixel addition mode with no addition of pixel signals. Furthermore, the imaging apparatus 100 is assumed to be installed on a side of a road and the road extends in the row direction.

As illustrated in FIG. 9A, the past frame 510 includes an image of an automobile 511, for example. As illustrated in FIG. 9B, the solid-state imaging element 200 performs pixel addition on each of columns and generates the line data 520. The line data 520 includes pixel addition data 521 corresponding to the automobile 511.

Figure 10A:
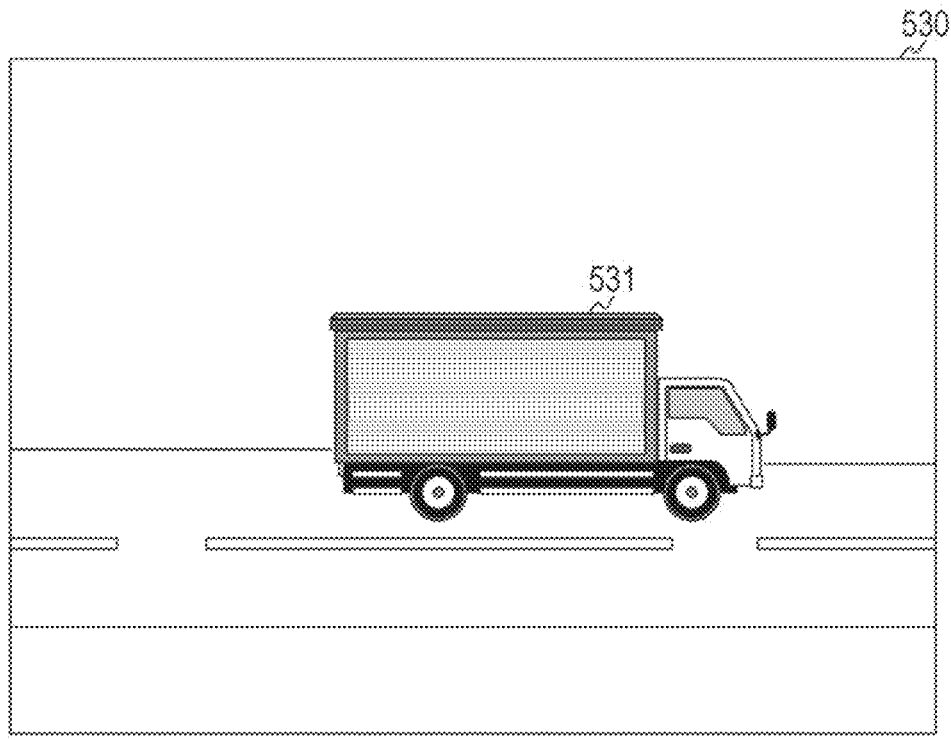
FIGS. 10A and 10B are diagrams illustrating an example of a current frame and current addition data according to the first embodiment of the present technology.
Figure 10B:
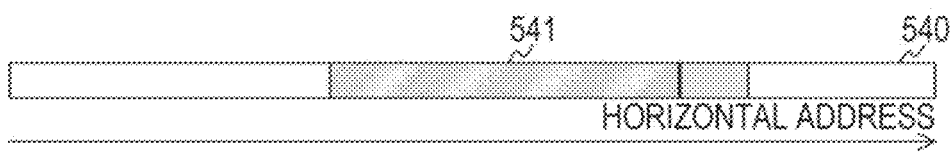

FIGS. 10A and 10B are diagrams illustrating an example of a current frame and past addition data according to the first embodiment of the present technology. FIG. 10A is an example of a current frame 530, and FIG. 10B in the figure is an example of line data 540 including N pieces of current addition data.

As illustrated in FIG. 10A, the current frame 530 includes an image of an automobile 531 that has moved in the row direction. As illustrated in FIG. 10B, the solid-state imaging element 200 performs pixel addition on each of columns and generates the line data 540. The line data 540 includes pixel addition data 541 corresponding to the automobile 531. Since the automobile 531 has moved in the row direction, a horizontal address position of the pixel addition data 541 changes to a position different from the pixel addition data 521 of the past frame. Therefore, the value of the summed value SUM calculated by Formula 1 exceeds a motion determination threshold, enabling the imaging apparatus 100 to judge that there has been a motion in the subject.

[Operation Example of Imaging Apparatus]

Figure 11:
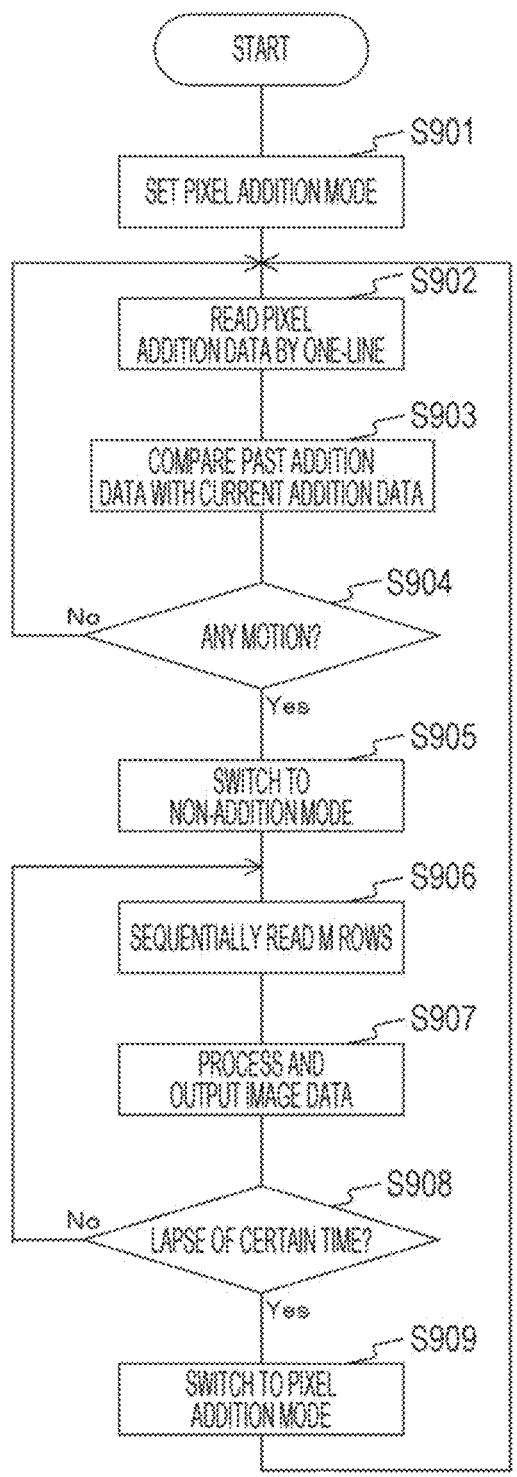
FIG. 11 is a flowchart illustrating an example of operation of the imaging apparatus according to the first embodiment of the present technology.

FIG. 11 is a flowchart illustrating an example of operation of the imaging apparatus 100 according to the first embodiment of the present technology. This operation is started, for example, when the power supply is turned on or when a start-up operation is performed.

The imaging apparatus 100 sets the operation mode to the pixel addition mode (step S901). Next, the imaging apparatus 100 performs pixel addition and reads one line (N pieces) of pixel addition data (step S902). The imaging apparatus 100 compares the past addition data with the current addition data (step S903). Note that when the imaging apparatus 100 generates first current addition data in the pixel addition mode, there is no past addition data. Accordingly, the current addition data is compared with predetermined pixel addition data preliminarily generated from a background image, for example.

Next, the imaging apparatus 100 judges the presence or absence of motion of the subject using Formula 1 (step S904). In a case where there is no motion (step S904: No), the imaging apparatus 100 repeats execution of processing from step S902 onward.

In contrast, in a case where there is a motion (step S904: Yes), the imaging apparatus 100 switches the operation mode to the non-addition mode (step S905) and sequentially reads the M rows (step S906). Next, the imaging apparatus 100 processes and outputs the image data (step S907). The imaging apparatus 100 judges whether or not a certain period has elapsed since the mode has been switched to the non-addition mode (step S908). In a case where a certain time has not elapsed (step S908: No), the imaging apparatus 100 repeats execution of the processing from step S906 onward.

In contrast, in a case where a certain time has elapsed (step S908: Yes), the imaging apparatus 100 switches the operation mode to the pixel addition mode (step S909) and repeats execution of the processing from step S902 onward.

In this manner, according to the first embodiment of the present technology, the imaging apparatus 100 performs pixel addition for each of columns and performs AD conversion on N pixel addition signals in the pixel addition mode. Accordingly, it is possible to reduce power consumption as compared with the case where AD conversion is performed on all the N×M pixel signals. Furthermore, the imaging apparatus 100 reads all the pixel signals without thinning signals and adds up the read signals for each of columns. Accordingly, it is possible to reduce the power consumption without reducing the number of pixel signals to be read.

2. Second Embodiment

In the first embodiment described above, the imaging apparatus 100 determines the presence or absence of motion of the subject and switches the operation mode to the non-addition mode when motion is present. However, in a case where the imaging apparatus 100 is used for imaging an object (such as an automobile) moving at a constant speed or more in the non-addition mode, the mode might be switched to the non-addition mode even when a subject (such as plants) other than the object moves, leading to a possible concern that the power consumption cannot be sufficiently reduced. Therefore, in a second embodiment, the object speed is further measured in the pixel addition mode. That is, the imaging apparatus 100 according to the second embodiment is different from the first embodiment in that the speed of the object is measured in the pixel addition mode.

Figure 12:
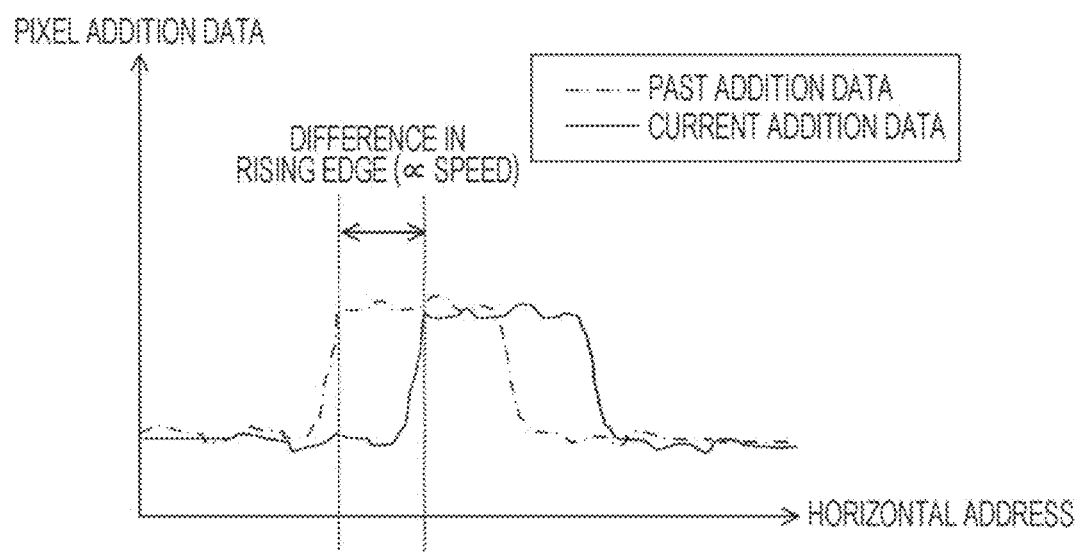
FIG. 12 is a graph illustrating an example of trajectories of past addition data and current addition data for each of horizontal addresses in a second embodiment of the present technology.

FIG. 12 is a graph illustrating an example of trajectories of past addition data and current addition data for each of horizontal addresses in the second embodiment of the present technology. In the figure, the vertical axis indicates the values of the past addition data and the current addition data, and the horizontal axis indicates the horizontal address. A fixed chain line indicates a trajectory of the past addition data, and a solid line indicates a trajectory of the current addition data.

In a case where an object such as an automobile moves in the row direction, a difference DIFF of the horizontal address of each of predetermined feature points (rising edge, etc.) between the trajectory of the past addition data and the trajectory of the current addition data changes in accordance with a movement speed Vh. For example, the movement speed Vh is expressed by the following formula.

$$Vh = \text{DIFF} \times k \times (f_{VSYNC}) \quad \text{Formula 2}$$

In the above Formula, k is a coefficient for converting the difference DIFF into a moving distance. Furthermore, $f_{VSYNC}$ is the frequency of the vertical synchronization signal VSYNC, in the unit of Hertz (Hz), for example. The unit of the movement speed Vh is meter per second (m/s), for example.

With the use of Formula 2, the imaging apparatus 100 can measure the movement speed Vh from the difference DIFF.

Figure 13:
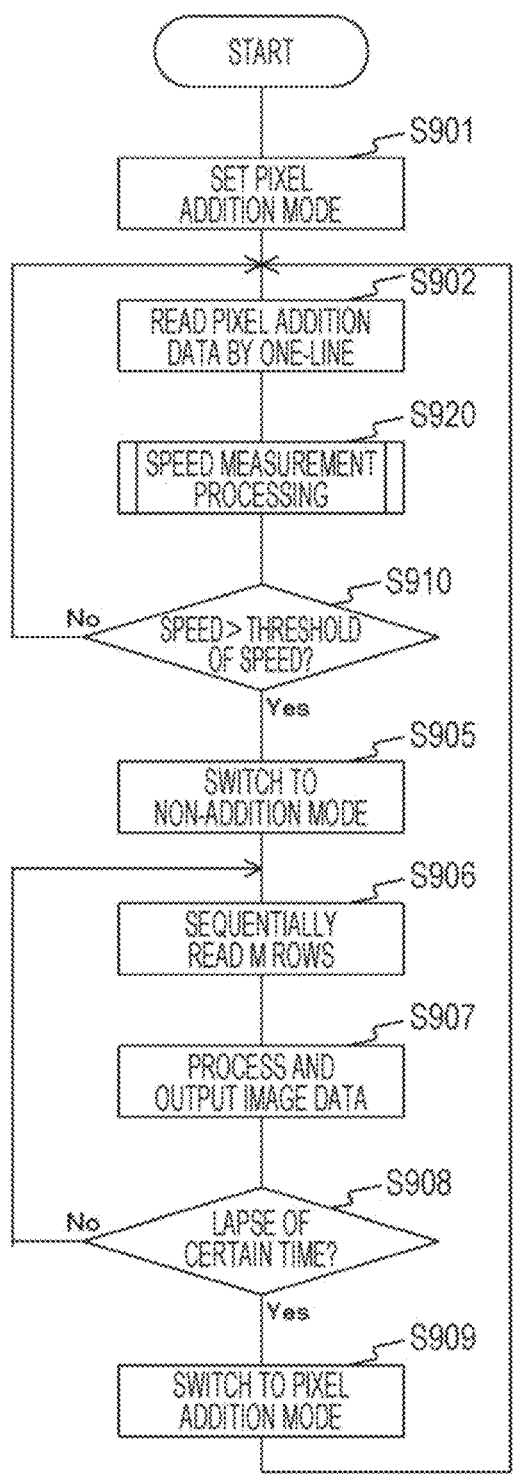
FIG. 13 is a flowchart illustrating an example of operation of the imaging apparatus according to the second embodiment of the present technology.

FIG. 13 is a flowchart illustrating an example of operation of the imaging apparatus 100 according to the second embodiment of the present technology. Operation of the imaging apparatus 100 according to the second embodiment is different from that of the first embodiment in that steps S910 and S920 are executed instead of steps S903 and S904.

In the pixel addition mode, the imaging apparatus 100 reads pixel addition data for one line (step S902), and executes speed measurement processing for measuring the movement speed in the row direction (step S920). Next, the imaging apparatus 100 judges whether or not the measured movement speed exceeds a predetermined speed threshold (step S910). In a case where the movement speed is the speed threshold or less (step S910: No), the imaging apparatus 100 repeats execution of the processing from step S902 onward. In contrast, in a case where the movement speed exceeds a predetermined speed threshold (step S910: Yes), the imaging apparatus 100 switches the operation mode to the non-addition mode (step S905).

In the non-addition mode, the imaging apparatus 100 can execute various types of processing in a road traffic system. For example, the imaging apparatus 100 identifies automobiles and pedestrians in image data, and performs processing of individually counting the number of automobiles and pedestrians. Alternatively, the imaging apparatus 100 captures a whole image of an automobile that has exceeded the legal speed and holds it as an evidence photograph. As another alternative, the imaging apparatus 100 images and holds the license plate of the automobile that has exceeded the legal speed.

Figure 14:
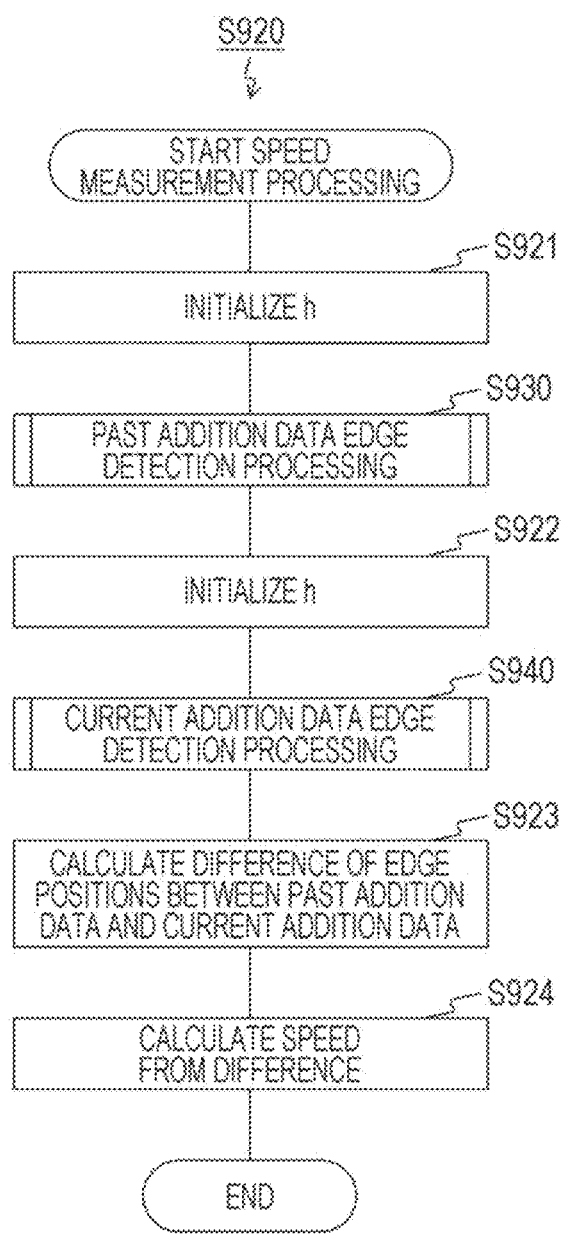
FIG. 14 is a flowchart illustrating an example of speed measurement processing according to the second embodiment of the present technology.

FIG. 14 is a flowchart illustrating an example of speed measurement processing according to the second embodiment of the present technology. The imaging apparatus 100 initializes a variable h to an initial value ("0", etc.) (step S921) and executes past frame edge detection processing (step S930) for detecting a rising edge of the past addition data.

Next, the imaging apparatus 100 initializes the variable h (step S922), and executes current frame edge detection processing (step S940) for detecting the rising edge of the current addition data. The imaging apparatus 100 calculates the difference DIFF of the position (horizontal address) of the rising edge between the past addition data and the current addition data (step S923), and calculates the movement speed Vh from the difference DIFF using Formula 2 (step S924). After step S924, the imaging apparatus 100 finishes the speed measurement processing.

Figure 15:
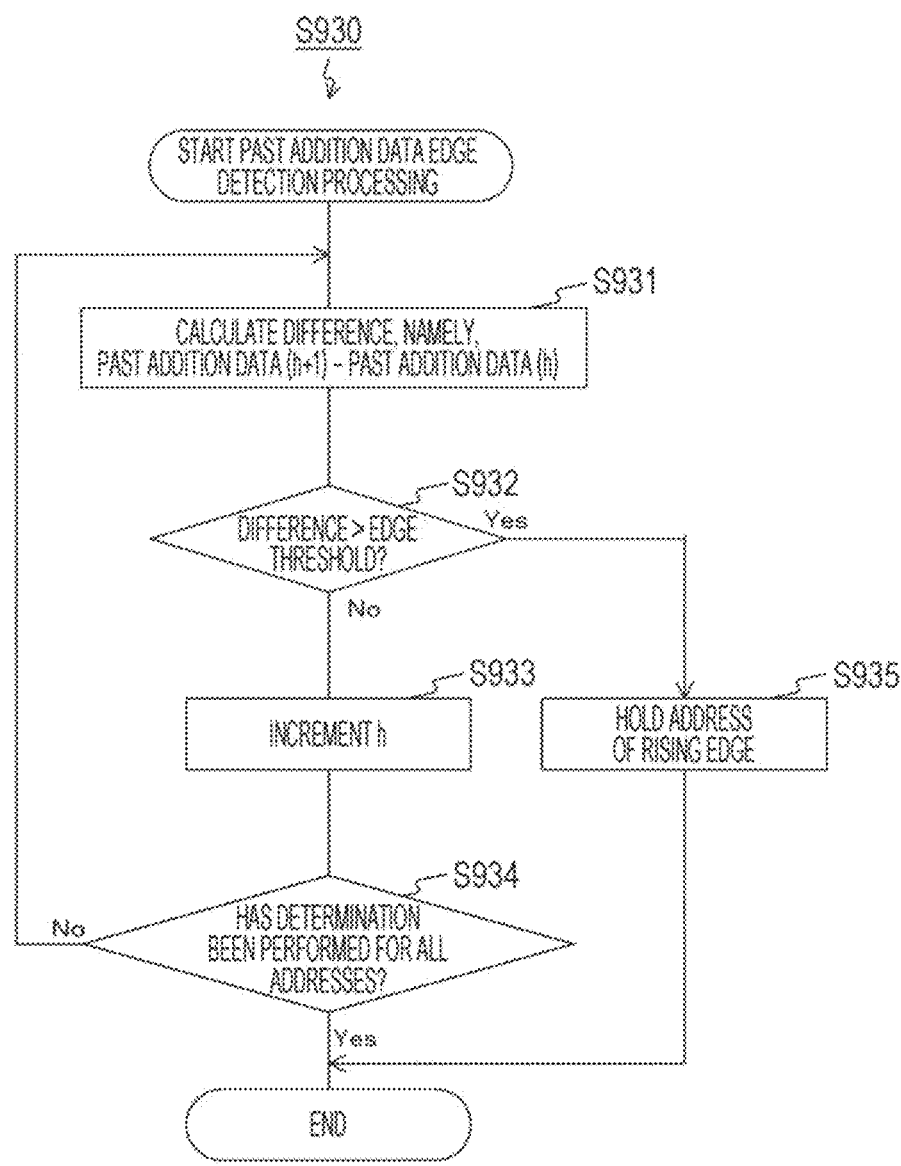
FIG. 15 is a flowchart illustrating an example of past addition data edge detection processing according to the second embodiment of the present technology.

FIG. 15 is a flowchart illustrating an example of past addition data edge detection processing according to the second embodiment of the present technology. The imaging apparatus 100 calculates a difference between past addition data having a horizontal address h+1 and past addition data having a horizontal address h (step S931). Next, the imaging apparatus 100 judges whether or not the difference is greater than a predetermined edge threshold (step S932).

In a case where the difference is the predetermined edge threshold or less (step S932: No), the imaging apparatus 100 increments h (step S933), and judges whether or not the determination in step S932 has been performed for all the horizontal addresses (step S934). In a case where there is an address that has not been determined (step S934: No), the imaging apparatus 100 repeats execution of the processing from step S931 onward.

Furthermore, in a case where the difference is larger than the predetermined edge threshold (step S932: Yes), the imaging apparatus 100 holds h as a horizontal address of a rising edge of the past addition data (step S935).

In a case where the determination is made for all the horizontal addresses (step S934: Yes), or after execution of step S935, the imaging apparatus 100 finishes the past frame edge detection processing.

Figure 16:
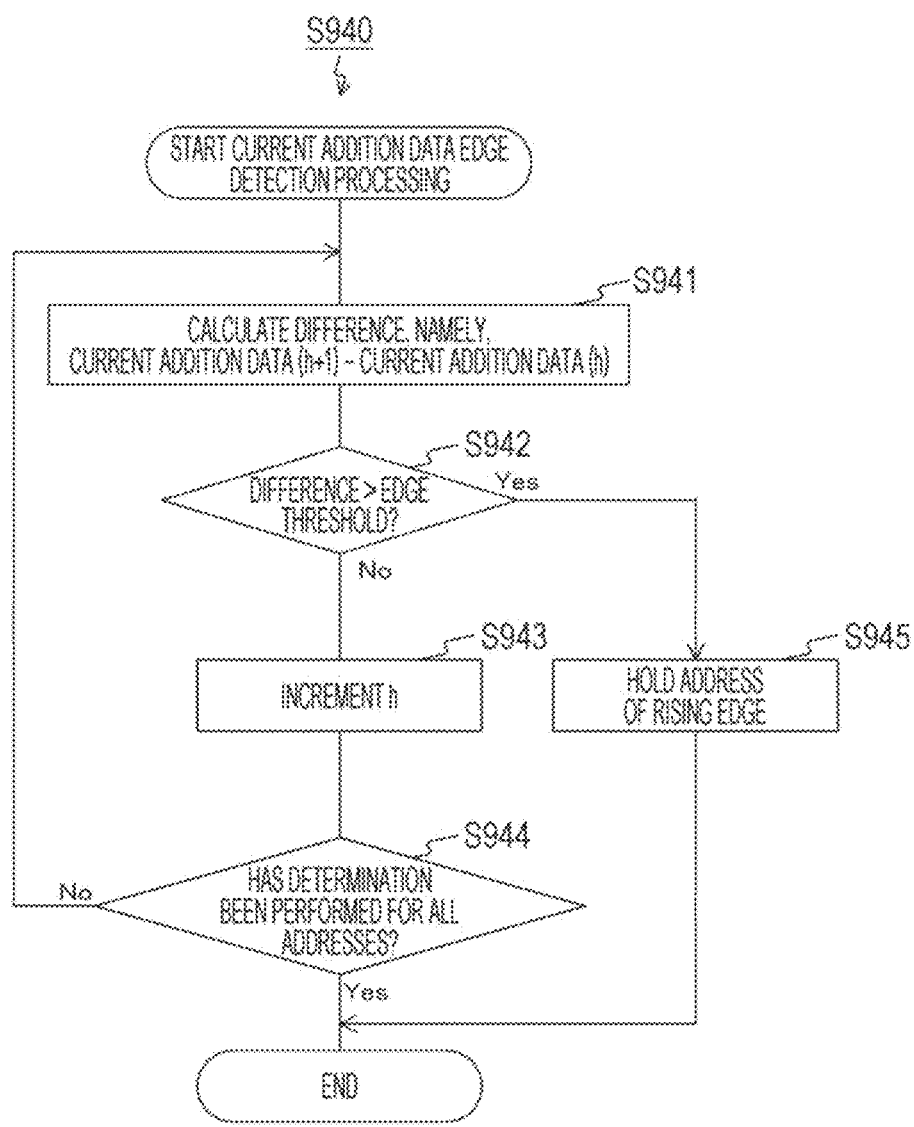
FIG. 16 is a flowchart illustrating an example of current addition data edge detection processing according to the second embodiment of the present technology.

FIG. 16 is a flowchart illustrating an example of current addition data edge detection processing according to the second embodiment of the present technology. The imaging apparatus 100 calculates a difference between current addition data of the horizontal address h+1 and current addition data of the horizontal address h (step S941). Next, the imaging apparatus 100 judges whether or not the difference is greater than a predetermined edge threshold (step S942).

In a case where the difference is the predetermined edge threshold or less (step S942: No), the imaging apparatus 100 increments h (step S943), and judges whether or not the determination in step S942 has been performed for all the horizontal addresses (step S944). In a case where there is an address that has not been determined (step S944: No), the imaging apparatus 100 repeats execution of the processing from step S941 onward.

In addition, in a case where the difference is larger than the predetermined edge threshold (step S942: Yes), the imaging apparatus 100 holds h as the horizontal address of the rising edge of the current addition data (step S945).

In a case where the determination is made for all the horizontal addresses (step S944: Yes), or after execution of step S945, the imaging apparatus 100 finishes the current frame edge detection processing.

Note that although the imaging apparatus 100 calculates the speed from the difference between the rising edges of the past addition data and the current addition data, calculation of the speed is not limited to this configuration. For example, the imaging apparatus 100 can calculate a difference in the falling edges and then can calculate the speed from the difference. In addition, the imaging apparatus 100 can calculate a difference in the peak values and calculate the speed from the difference.

In this manner, according to the second embodiment of the present technology, the imaging apparatus 100 switches to the non-addition mode when the movement speed of the subject exceeds a speed threshold. Accordingly, it is possible to continue the pixel addition mode even in a case where the subject has just moved at a speed being a speed threshold or less. This would make it possible to further reduce power consumption.

3. Third Embodiment

In the second embodiment described above, the imaging apparatus 100 measures the movement speed in the row direction. However, depending on the installation position of the imaging apparatus 100, the subject might move in the depth direction, leading to a possible concern that accurate measurement of the movement speed cannot be made in some cases. Therefore, the imaging apparatus 100 according to a third embodiment measures the movement speed in the depth direction. That is, the imaging apparatus 100 according to the third embodiment is different from the second embodiment in that the movement speed in the depth direction is measured.

Figure 17:
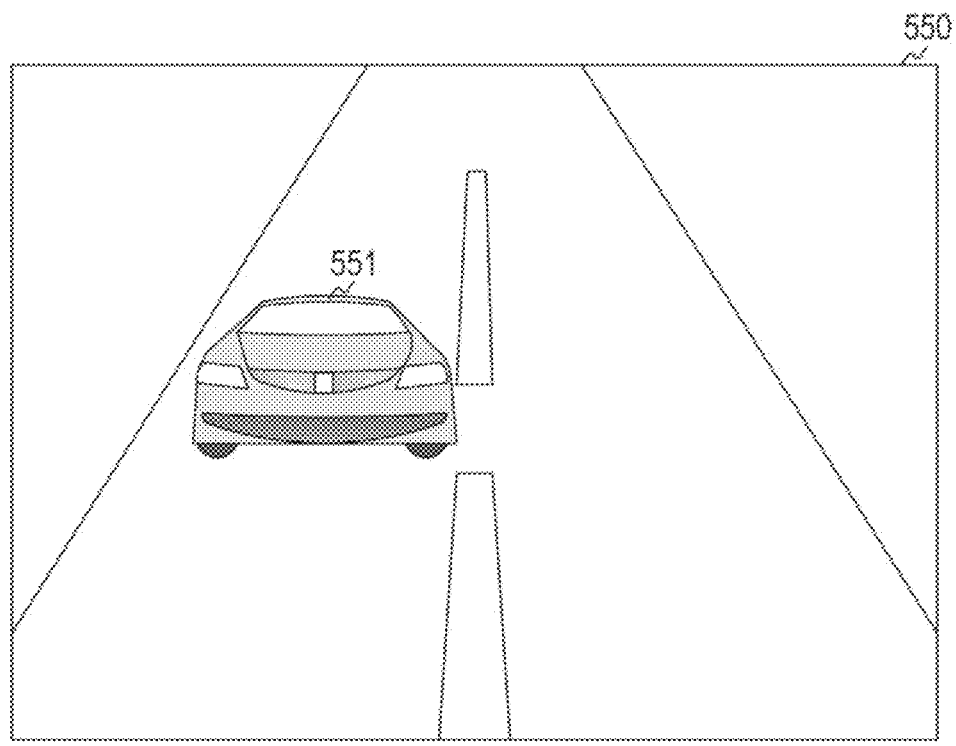
FIG. 17 is a view illustrating an example of a past frame according to a third embodiment of the present technology.

FIG. 17 is a view illustrating an example of a past frame 550 according to the third embodiment of the present technology. The third embodiment assumes that the imaging apparatus 100 is installed at an upper side of the road and that the road extends in an optical axis direction (in other words, the depth direction). The past frame 550 includes an image of an automobile 551, for example.

Figure 18:
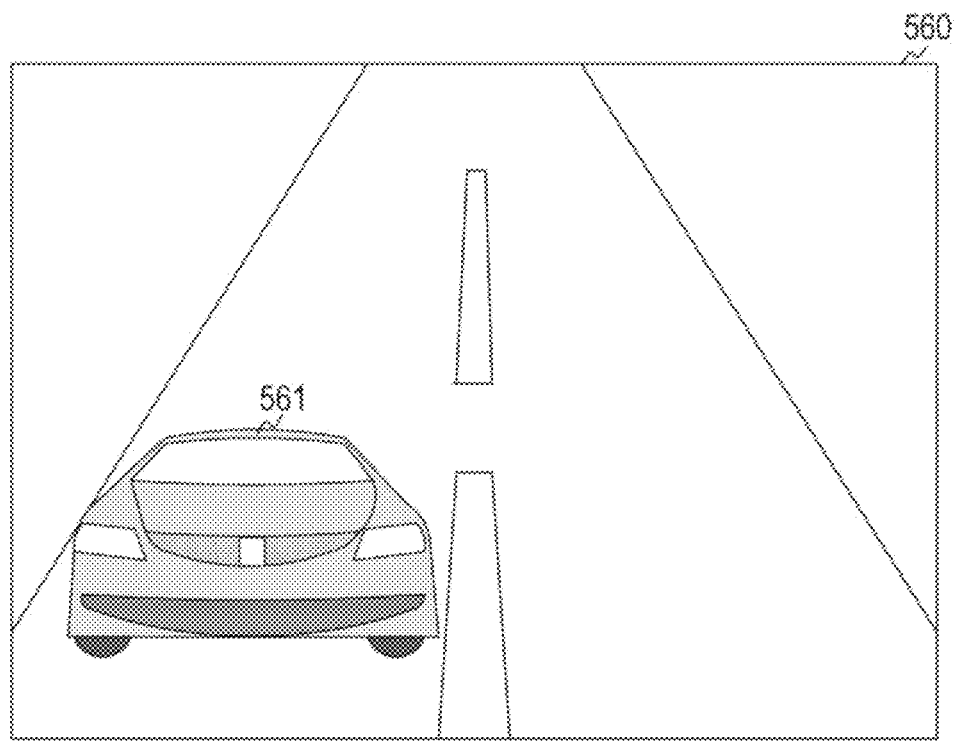
FIG. 18 is a view illustrating an example of a current frame according to the third embodiment of the present technology.

FIG. 18 is a view illustrating an example of a current frame 560 according to the third embodiment of the present technology. The current frame 560 includes an image of an automobile 561. This automobile 561 is moving toward the front side (near) compared to the position at imaging of the past frame 550. This makes the width of the automobile 561 in the current frame 560 in the row direction appear wider than that of the automobile 551.

Figure 19:
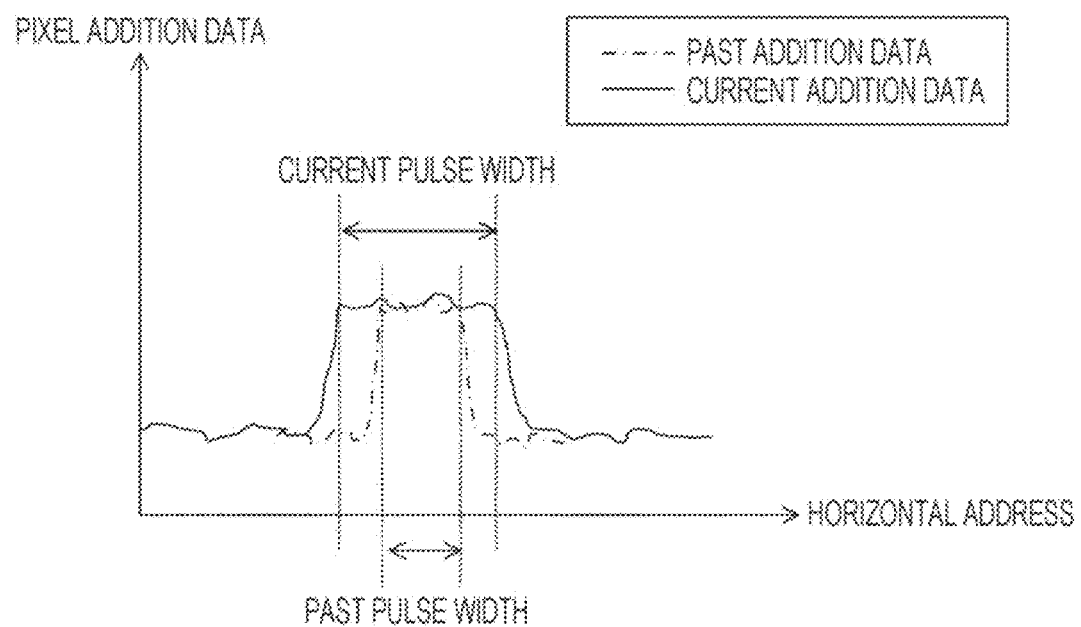
FIG. 19 is a graph illustrating an example of trajectories of past addition data and current addition data for each of horizontal addresses in the third embodiment of the present technology.

FIG. 19 is a graph illustrating an example of trajectories of past addition data and current addition data for each of horizontal addresses in the third embodiment of the present technology. In the figure, the vertical axis indicates the values of the past addition data and the current addition data, and the horizontal axis indicates the horizontal address. A fixed chain line indicates a trajectory of the past addition data, and a solid line indicates a trajectory of the current addition data.

In a case where an object such as an automobile moves in the depth direction, a difference between pulse widths of the trajectory of the past addition data and the trajectory of the current addition data is a value corresponding to a movement speed Vd in the depth direction. Here, the pulse width indicates a difference between the horizontal address of the rising edge and the horizontal address of the falling edge.

Figure 20:
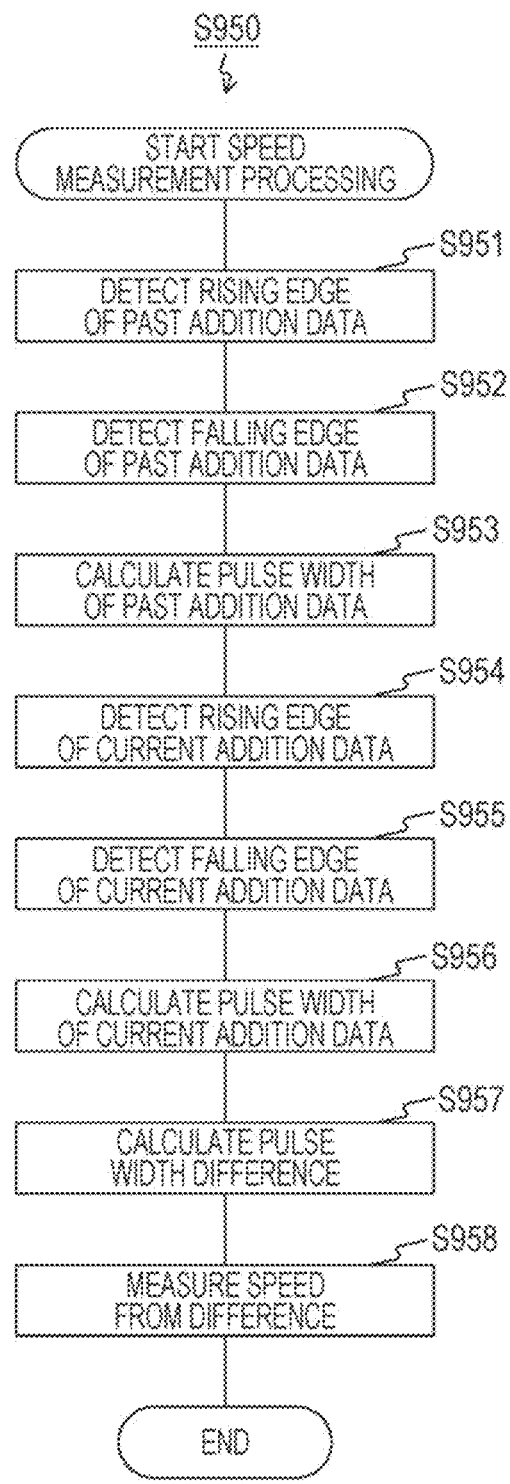
FIG. 20 is a flowchart illustrating an example of speed measurement processing according to the third embodiment of the present technology.

FIG. 20 is a flowchart illustrating an example of speed measurement processing according to the third embodiment of the present technology. The imaging apparatus 100 detects the horizontal address of the rising edge of the past addition data (step S951). The procedure of detecting the address of the rising edge is similar to the case in the second embodiment. Furthermore, the imaging apparatus 100 detects the horizontal address of the falling edge of the past addition data (step S952). Next, the imaging apparatus calculates the difference between the addresses as a pulse width of the past addition data (step S953).

Furthermore, the imaging apparatus 100 detects the horizontal address of the rising edge of the current addition data (step S954), and detects the horizontal address of the falling edge of the current addition data (step S955). Next, the imaging apparatus calculates the difference between the addresses as a pulse width of the current addition data (step S956).

Next, the imaging apparatus 100 calculates a difference between the pulse widths of the trajectory of the past addition data and the trajectory of the current addition data (step S957), and measures the movement speed in the depth direction from the difference (step S958). For example, the movement speed is calculated from Formula 2 in which the coefficient k has been adjusted.

Note that although the imaging apparatus 100 measures the movement speed in the depth direction, the imaging apparatus 100 may determine whether the movement direction is the depth direction or the row direction before measuring the movement speed. For example, in a case where the difference in the pulse widths between the past addition data and the current addition data is a predetermined direction determination threshold or less, the imaging apparatus 100 determines that the movement direction is the row direction and then measures the movement speed with a procedure similar to the case of the second embodiment. In contrast, in a case where the difference between the pulse widths exceeds the direction determination threshold, the imaging apparatus 100 determines that the movement direction is the depth direction and then measures the movement speed in the procedure illustrated in FIG. 20.

In this manner, according to the third embodiment of the present technology, the imaging apparatus 100 switches to the non-addition mode when the movement speed in the depth direction exceeds the speed threshold. Accordingly, it is possible to continue the pixel addition mode even when the subject has moved in the depth direction at a speed being the speed threshold or less. This would make it possible to further reduce power consumption.

Note that the above-described embodiment illustrates an example for embodying the present technology, and the matter of the embodiments corresponds to the subject matter of the invention included in the appended claims. Similarly, the subject matter of the invention included in the appended claims corresponds to the matter under the same names as the matter in the embodiments of the present technology, respectively. The present technology, however, is not limited to the embodiments, and can be embodied by making various modifications to the embodiments without departing from the scope of the technology.

Furthermore, the processing procedure in the above-described embodiments may be regarded as a method including these series of procedures, and as a program for causing a computer to execute these series of procedures or as a recording medium storing the program. This recording medium can be a compact disc (CD), a mini disc (MD), a digital versatile disc (DVD), a memory card, a Blu-ray (registered trademark) disc, or the like, for example.

Note that effects described here in the present description are provided for purposes of exemplary illustration and are not intended to be limiting. Still other effects may also be contemplated.

Note that the present technology may also be configured as below.

(1) An imaging apparatus including:
a pixel array unit including a plurality of lines each having a plurality of pixels arranged in a predetermined direction;
a scanning circuit that sequentially selects the plurality of lines and controls to output an analog signal from each of the pixels within the selected line in a non-addition mode and that controls to add up the analog signals of each of the pixels arranged in a direction perpendicular to the predetermined direction and output the added signals in a pixel addition mode;
an analog-to-digital conversion unit that converts each of the analog signals to a digital signal; and
a control unit that performs control of switching from one of the pixel addition mode and the non-addition mode to the other of the pixel addition mode and the non-addition mode on the basis of the digital signal.

(2) The imaging apparatus according to (1),
in which the analog-to-digital converter outputs the digital signal as pixel addition data in the pixel addition mode, and
the control unit switches from the non-addition mode to the pixel addition mode on the basis of the pixel addition data.

(3) The imaging apparatus according to (2),
in which the control unit measures a speed of an object from the pixel addition data, and switches from the non-addition mode to the pixel addition mode in a case where the speed exceeds a predetermined speed.

(4) The imaging apparatus according to (3),
in which the control unit measures the speed in the predetermined direction.

(5) The imaging apparatus according to (3),
in which the control unit measures the speed in a depth direction.

(6) The imaging apparatus according to any of (1) to (5),
in which the pixel array unit includes:
the plurality of pixels; and
a pixel addition unit that adds up the analog signal of each of the pixels arranged in the perpendicular direction and that outputs the added analog signals in the pixel addition mode.

(7) The imaging apparatus according to any of (1) to (6),
further including a digital signal processing unit that executes predetermined processing on the digital signal in the non-addition mode.

(8) The imaging apparatus according to any of (1) to (7),
in which the control unit switches to the pixel addition mode when a predetermined time has elapsed after switching to the non-addition mode.

(9) An imaging apparatus control method including:
a scanning step of sequentially selecting a plurality of lines each having a plurality of pixels arranged in a predetermined direction and then controlling to output an analog signal from each of the pixels within the selected line in a non-addition mode, while simultaneously selecting the plurality of lines and controlling to add up the analog signals of each of the pixels arranged in a direction perpendicular to the predetermined direction and output the added signals in a pixel addition mode;
an analog-to-digital conversion step of converting each of the analog signals to a digital signal; and
a control step of performing control of switching from one of the pixel addition mode and the non-addition mode to the other of the pixel addition mode and the non-addition mode on the basis of the digital signal.

REFERENCE SIGNS LIST

100 Imaging apparatus
110 Imaging lens
120 Digital signal processing unit
130 Control unit
131 Imaging control unit
132 Mode control unit
133 Line buffer
134 Mode signal generation unit
135 Timer
140 Image output unit
200 Solid-state imaging element
210 Scanning circuit
220 Column signal processing unit
221 ADC
222 CDS processing unit
230 Timing control unit
240 Switch
300 Pixel array unit
310 Pixel
311 Photodiode
312 Transfer transistor
320 Pixel addition unit
321 Connection transistor
330 Signal generation unit
331 Reset transistor
332 Amplification transistor
333 Floating diffusion layer
334 Selection transistor

The invention claimed is:

1. An imaging apparatus, comprising:
a pixel array unit, wherein
the pixel array unit includes a plurality of lines;
each of the plurality of lines includes a first plurality of pixels; and
an arrangement of the first plurality of pixels of each of the plurality of lines is in a specific direction of the imaging apparatus;
a scanning circuit configured to:
in a non-addition mode:
sequentially select the plurality of lines; and
control each of the first plurality of pixels within each line of the plurality of lines to output a respective analog signal; and
in a pixel addition mode:
simultaneously select the plurality of lines;
control the simultaneously selected plurality of lines to add analog signals of a second plurality of pixels arranged in a direction perpendicular to the specific direction; and
output the added analog signals of the second plurality of pixels;
an analog-to-digital conversion unit configured to convert at least one of each of the analog signals of the first plurality of pixels or each of the analog signals of the second plurality of pixels to a digital signal; and
a control unit configured to:
capture a speed of an object;
switch from a first mode of the pixel addition mode or the non-addition mode to a second mode of the pixel addition mode or the non-addition mode based on the digital signal; and
switch from the pixel addition mode to the non-addition mode based on the captured speed of the object that is greater than a specific speed.

2. The imaging apparatus according to claim 1, wherein the analog-to-digital conversion unit is further configured to output the digital signal,
the digital signal is pixel addition data in the pixel addition mode, and
the control unit is further configured to switch from the pixel addition mode to the non-addition mode based on the pixel addition data.

3. The imaging apparatus according to claim 2, wherein the control unit is further configured to capture the speed of the object from the pixel addition data.

4. The imaging apparatus according to claim 3, wherein the control unit is further configured to capture the speed in the specific direction.

5. The imaging apparatus according to claim 3, wherein the control unit is further configured to capture the speed in a depth direction of the imaging apparatus.

6. The imaging apparatus according to claim 1, further comprising a digital signal processing unit configured to execute a specific process on the digital signal in the non-addition mode.

7. The imaging apparatus according to claim 1, wherein the control unit is further configured to switch from the non-addition mode to the pixel addition mode based on a specific time that has elapsed after the switch to the non-addition mode.

8. An imaging apparatus control method, comprising: in an imaging apparatus:
in a non-addition mode:
sequentially selecting a plurality of lines, wherein
each of the plurality of lines includes a first plurality of pixels, and
an arrangement of the first plurality of pixels of each of the plurality of lines is in a specific direction of the imaging apparatus; and
controlling each of the first plurality of pixels within each line of the plurality of lines to output a respective analog signal; and
in a pixel addition mode:
simultaneously selecting the plurality of lines;
controlling the simultaneously selected plurality of lines to add analog signals of a second plurality of pixels arranged in a direction perpendicular to the specific direction;
outputting the added analog signals of the second plurality of pixels;
converting at least one of each of the analog signals of the first plurality of pixels or each of the analog signals of the second plurality of pixels to a digital signal;
capturing a speed of an object;
switching from a first mode of the pixel addition mode or the non-addition mode to a second mode of the pixel addition mode or the non-addition mode based on the digital signal; and
switching from the pixel addition mode to the non-addition mode based on the captured speed of the object that is greater than a specific speed.

* * * * *